US008069449B2

(12) United States Patent
Cho et al.

(10) Patent No.: US 8,069,449 B2
(45) Date of Patent: Nov. 29, 2011

(54) METHOD AND SYSTEM FOR ENABLING A DEVICE TO SUPPORT ENHANCED FEATURES

(75) Inventors: Yu-Fong Cho, Linkou Shiang (TW); Chong-Li Liu, Sanchong (TW); Ming-Lung Chiu, Gueishan Township, Taoyuan County (TW)

(73) Assignee: NVIDIA Corporation, Santa Clara, CA (US)

( * ) Notice: Subject to any disclaimer, the term of this patent is extended or adjusted under 35 U.S.C. 154(b) by 1005 days.

(21) Appl. No.: 11/965,000

(22) Filed: Dec. 27, 2007

(65) Prior Publication Data

US 2009/0172708 A1 Jul. 2, 2009

(51) Int. Cl.
*G06F 1635/163* (2006.01)
(52) U.S. Cl. .......................... 719/312; 719/328
(58) Field of Classification Search .................. 719/312, 719/313, 328
See application file for complete search history.

(56) References Cited

U.S. PATENT DOCUMENTS

| | | | | |
|---|---|---|---|---|
| 6,760,804 | B1 * | 7/2004 | Hunt et al. ..................... | 710/313 |
| 2003/0158974 | A1 * | 8/2003 | Herrod et al. .................. | 709/328 |
| 2005/0099427 | A1 * | 5/2005 | Stokes .......................... | 345/589 |
| 2006/0007051 | A1 * | 1/2006 | Bear et al. ..................... | 345/1.1 |
| 2006/0129861 | A1 * | 6/2006 | Kee et al. ...................... | 713/323 |
| 2006/0245533 | A1 * | 11/2006 | Rostampour ................. | 375/377 |
| 2007/0198946 | A1 * | 8/2007 | Viji et al. ....................... | 715/779 |
| 2008/0126072 | A1 * | 5/2008 | Hutchison et al. ............. | 703/25 |
| 2009/0129370 | A1 * | 5/2009 | Toorians et al. ............... | 370/352 |

OTHER PUBLICATIONS

Lee, Wei-Meng, "Professional Windows Vista Gadgets Programming," (Dec. 5, 2007), Wiley Publishing, Inc., pp. 185-209, 307-364.*

* cited by examiner

*Primary Examiner* — H. S Sough
*Assistant Examiner* — Brian Wathen
(74) *Attorney, Agent, or Firm* — Patterson & Sheridan, LLP

(57) ABSTRACT

A method and system for enabling an auxiliary system, such as a WINDOWS® SIDESHOW™ device, to support enhanced features is provided. Specifically, one embodiment of the present invention sets forth a method, which includes the steps of emulating a physical communication channel to establish a virtual communication channel, encapsulating data associated with a first function defined by a first Application Programming Interface (API) and utilized to implement an enhanced feature, and sending the encapsulated data through the virtual communication channel for an embedded operation system (OS) to manage hardware resources of the auxiliary system to perform the enhanced feature.

20 Claims, 8 Drawing Sheets

METHOD AND SYSTEM FOR ENABLING A DEVICE TO SUPPORT ENHANCED FEATURES

BACKGROUND OF THE INVENTION

1. Field of the Invention

The present invention relates to WINDOWS® SIDE-SHOW™ technology, and more particularly, to a method and system for enabling a SIDESHOW™ device to support enhanced features.

2. Description of the Related Art

Unless otherwise indicated herein, the approaches described in this section are not prior art to the claims in this application and are not admitted to be prior art by inclusion in this section.

Windows® Vista® is a commercially available operating system from Microsoft Corporation of Redmond, Wash., hereinafter referred to as WINDOWS VISTA. Windows® SideShow™ is a commercially available application program from Microsoft Corporation of Redmond, Wash., hereinafter referred to as WINDOWS SIDESHOW. With WINDOWS VISTA operating systems becoming the dominant operating systems for personal computers, a variety of software or hardware applications compatible with Vista-based computer systems are also becoming more and more popular. One of the Vista-based software/hardware applications is WINDOWS SIDESHOW, which is a technology that supports an auxiliary screen to the Vista-based computer system.

Since WINDOWS SIDESHOW technology is initially designed to only support an auxiliary screen to display some primitive system information, a conventional WINDOWS SIDESHOW device is limited in its functionality and typically supports a minimal set of hardware resources. Without much hardware resources to manage, the conventional WINDOWS SIDESHOW device is configured with a relatively basic and non-expandable software stack. To illustrate, FIG. 1 is a simplified block diagram showing a software stack 100 of the conventional WINDOWS SIDESHOW device. The software stack 100 includes built-in gadget 102, a SIDESHOW Application Program Interface (API) 104, and a tiny Common Language Runtime (CLR) 106, which accesses and manages hardware resources 108. The tiny CLR 106 implements a subset of CLR, which is a virtual machine component of Microsoft .NET initiative.

The built-in gadget 102 is equipped with simple functions such as "Open Universal Asynchronous Receiver Transmitter (UART) and "Send UART" provided by the SIDESHOW API 104. Functions provided by the SIDESHOW API 104 are written in languages such as C# or VB.NET and are recognized by the tiny CLR 106. Continuing with the "Open UART" and "Send UART" examples, it should first noted that "Open UART" is basically configured to open a physical UART port supported by the hardware resources 108, and "Send UART" is configured to have data delivered to the opened physical UART port. In other words, the built-in gadget 102 in the software stack 100 can access the hardware resources 108 by opening a physical UART port and transferring data through the UART port. However, both "Open UART" and "Send UART" functions are supported by the SIDESHOW API 104 and recognized by the tiny CLR 106. Since the SIDESHOW API 104 and the tiny CLR 106 are designed to only support a limited set of functions and interact with a minimal set of hardware resources, it is difficult to enhance the functionalities or the hardware resources of the conventional WINDOWS SIDESHOW device given the inherent restrictions imposed by the software stack 100.

What is needed in the art is thus a method and system that enable a WINDOWS SIDESHOW device to support enhanced features and access additional hardware resources to address at least the problems set forth above.

SUMMARY OF THE INVENTION

A method and system for enabling an auxiliary system, such as a WINDOWS SIDESHOW device, to support enhanced features is provided. Specifically, one embodiment of the present invention sets forth a method, which includes the steps of emulating a physical communication channel to establish a virtual communication channel, encapsulating data associated with a first function defined by a first Application Programming Interface (API) and utilized to implement an enhanced feature, and sending the encapsulated data through the virtual communication channel for an embedded operation system (OS) to manage hardware resources of the auxiliary system to perform the enhanced feature.

At least one advantage of the present invention disclosed herein is to enable a WINDOWS SIDESHOW device to support more advanced features than simply displaying primitive images.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

Throughout this description, a computer system may include a main system and an auxiliary system. The main system typically is configured with a feature-rich operating system, such as WINDOWS VISTA, and much computing resources, such as central processing units (CPUs) and memory systems. The auxiliary system, on the other hand, is typically configured with embedded software programs and limited hardware resources. A "primary display" broadly refers to the display mainly driven by the main system, and an "auxiliary display" broadly refers to the display that can be driven by either the main system or the auxiliary system. Here, an example of the main system is a laptop computer, and an example of the auxiliary system is a WINDOWS SIDESHOW device coupled to the laptop computer.

Figure 1:
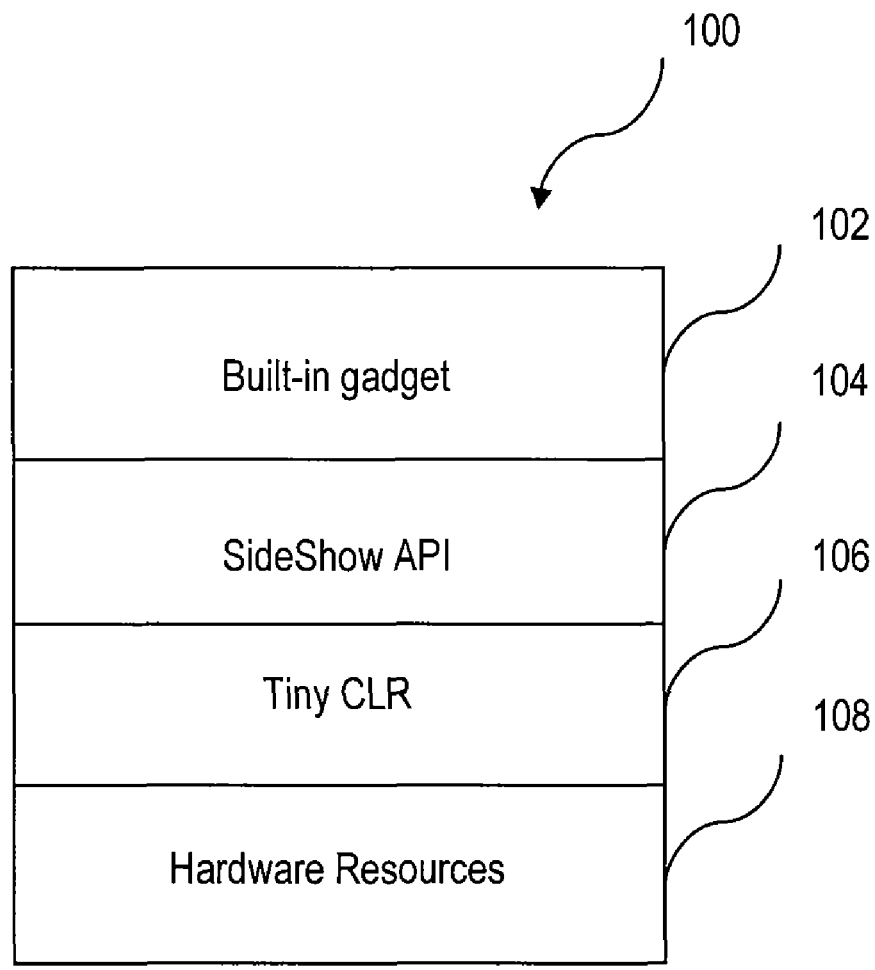
FIG. 1 is a simplified block diagram showing a software stack of a conventional WINDOWS SIDESHOW device.
Figure 2A:
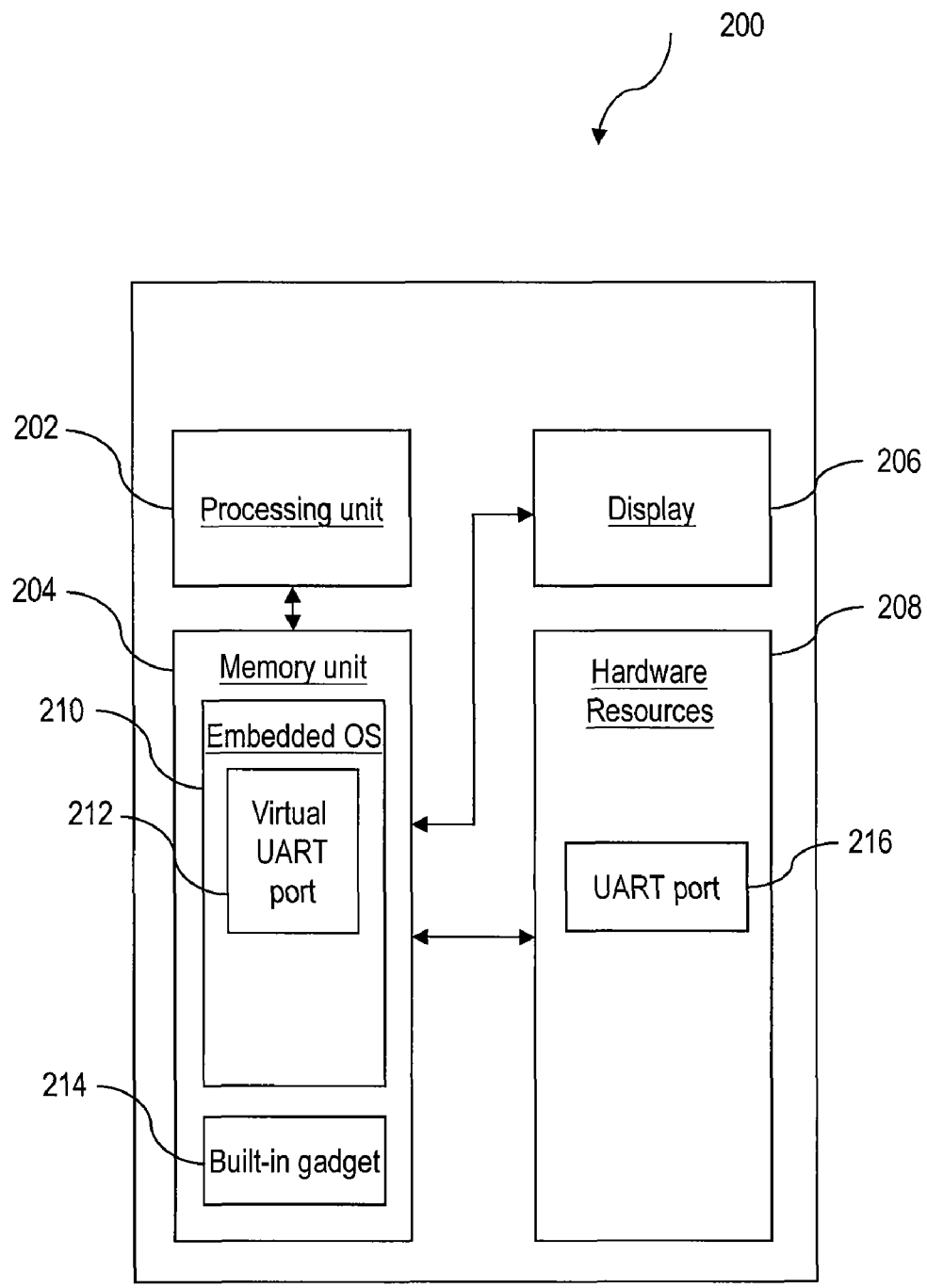
FIG. 2A is a simplified block diagram of a WINDOWS SIDESHOW device configured to support enhanced functions and hardware resources, according to one embodiment of the present invention.

FIG. 2A is a simplified block diagram of a WINDOWS SIDESHOW device 200 configured to support enhanced functions and hardware resources, according to one embodiment of the present invention. The WINDOWS SIDESHOW device 200 includes a processing unit 202, a memory unit 204, an auxiliary display 206, and hardware resources 208. In one implementation, the memory unit 204 stores an embedded OS 210, a virtual UART port 212 emulated by the embedded OS 210, and a built-in gadget 214. One implementation of the hardware resources 208 includes a physical UART port 216. It is worth noting that if the WINDOWS SIDESHOW device 200 is configured with the software stack 100 shown in FIG. 1 and even if it is enhanced with additional hardware resources, none of the additional hardware resources can be accessed.

In one implementation, the virtual UART port 212 is a software construct emulating the same attributes of a physical UART port, such as the physical UART port 216. Once instantiated, the virtual UART port 212 is utilized to facilitate communications between different software components that operate on the WINDOWS SIDESHOW device 200. To further illustrate, suppose the WINDOWS SIDESHOW device 200 includes speakers in the hardware resources 208. For the built-in gadget 214 to access the speakers and cause it to play back certain music, the virtual UART port 212 is instantiated and utilized so that the built-in gadget 214 can properly communicate with the embedded OS 210.

Figure 2B:
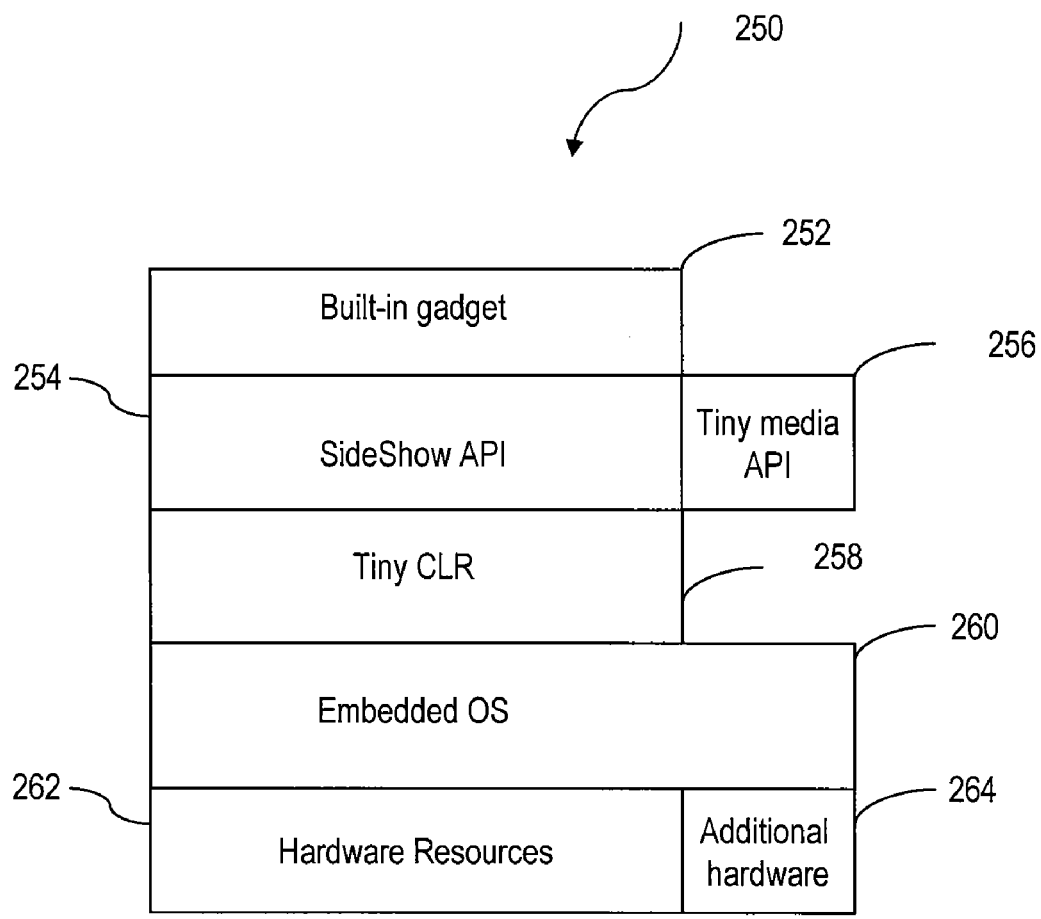
FIG. 2B is a simplified block diagram illustrating a software stack for supporting enhanced functions and hardware resources, according to one embodiment of the present invention.

FIG. 2B is a simplified block diagram illustrating a software stack 250 for supporting enhanced functions and hardware resources, according to one embodiment of the present invention. The software stack 250 includes a built-in gadget 252, a WINDOWS SIDESHOW API 254, a tiny media API 256, a tiny CLR 258, and an embedded OS 260. The embedded OS 260 manages hardware resources 262. A subset of the hardware resources 262 refers to additional hardware 264, which the conventional software stack 100 of FIG. 1 is unable to access. The embedded OS 260 also provides a layer of hardware abstraction for the tiny CLR 258. This way, the embedded OS 260 can interact with and manipulate the hardware resources 262 in a more sophisticated manner without disrupting how the tiny CLR 258 is intended to operate in a WINDOWS SIDESHOW device. The tiny media API 256 supplements the WINDOWS SIDESHOW API 254 by supporting additional functions that are not provided by the WINDOWS SIDESHOW API 254.

To illustrate how the WINDOWS SIDESHOW device 200 of FIG. 2A can be configured to support an enhanced feature, such as playing back music, suppose the WINDOWS SIDESHOW API 254 does not support any music playback related functions but the tiny media API 256 does. With the tiny media API 256 in the software stack 250, the built-in gadget 252 can be written to allow a user of the WINDOWS SIDESHOW device 200 to select a music file to play back. However, since the tiny CLR 258 is not designed to recognize the music playback related functions defined in the tiny media API 256, one way for the built-in gadget 252 to still cause the selected music file to be played back is to emulate a particular communication channel that is supported by the tiny CLR 258, such as a UART port. More specifically, by going through the virtual UART port 212 shown in FIG. 2A and described above, the commands and related data intended for the embedded OS 260 can be encapsulated and sent through the virtual UART port 212 to reach the embedded OS 260. Based on the received commands and data, the embedded OS 260 then accesses the hardware resources 262 and causes the selected file to be played back on the speakers.

Figure 3:
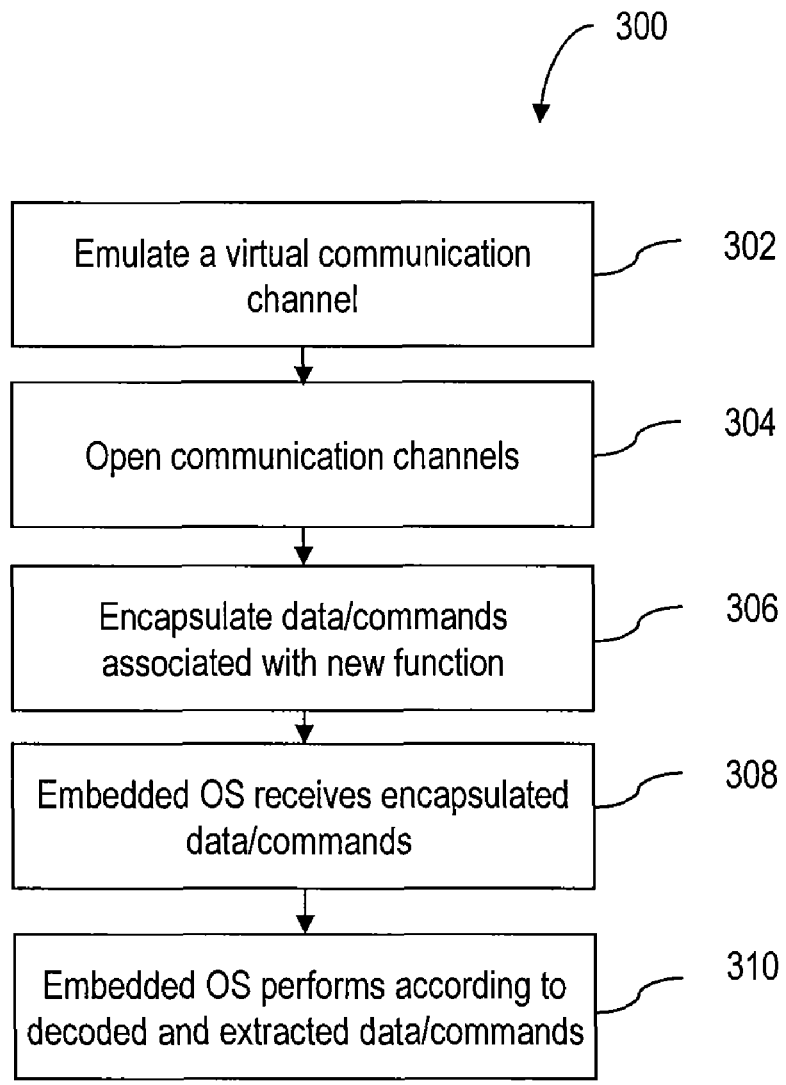
FIG. 3 is a flow chart further detailing a process for enabling a WINDOWS SIDESHOW device to support enhanced features, according to one embodiment of the present invention.

In conjunction with FIGS. 2A and 2B, FIG. 3 is a flow chart further detailing a process 300 for enabling the WINDOWS SIDESHOW device 200 to support enhanced features, according to one embodiment of the present invention. Continuing with the music playback example, the embedded OS 260 is configured to emulate a communication channel that is supported by the tiny CLR 258 in step 302. In one implementation, the physical UART port 216 is emulated, so that the emulated software component, the virtual UART port 212, supports the same attributes and behaviors as the physical UART port 216. In step 304, the embedded OS 260 opens the virtual UART port 212 and also the physical UART ports. In one implementation, the emulation of the virtual UART port 212 and the opening of both the physical and the virtual UART ports takes place as the WINDOWS SIDESHOW device 200 completes its initiation process. For a new function supported by the tiny media API 256 and invoked to perform the enhanced feature, any command or data associated with the new function is encapsulated in step 306 before delivery through the virtual UART port 212. In one implementation, the encapsulation is accomplished by packetizing and encoding the command or data. After the embedded OS 260 receives the encapsulated command or data in step 308, the embedded OS 260 extracts the command or data. Then the embedded OS 260 executes the command and accesses the file to be played back according to the extracted information in step 310. The subsequent paragraphs further detail the processes of encapsulation and extraction of data.

Figure 4A:
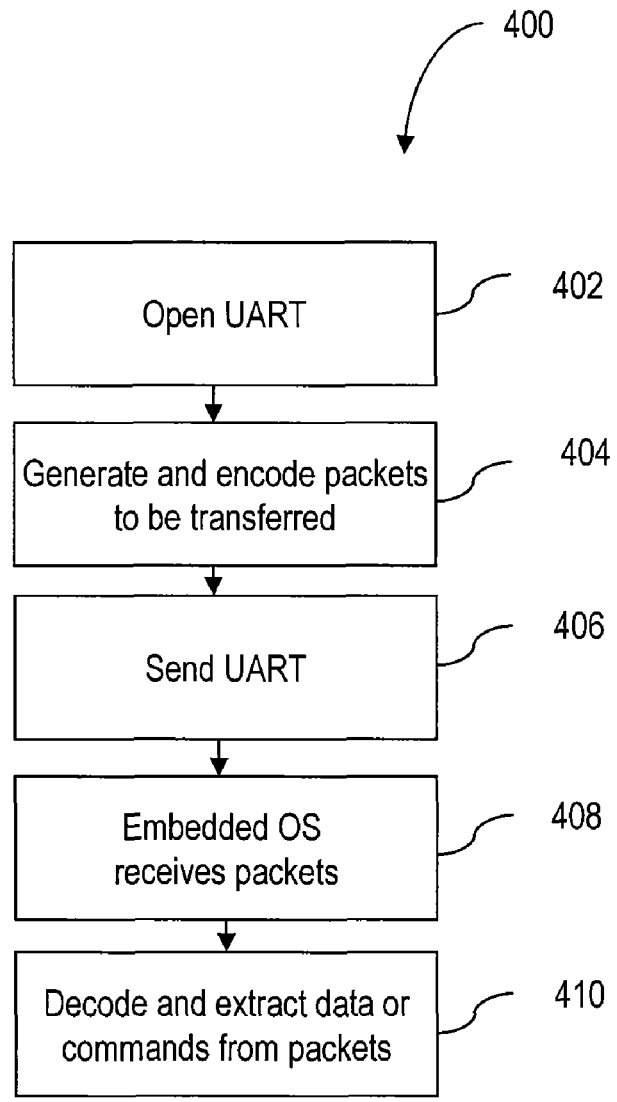
FIG. 4A is a flow chart illustrating a sequence of pseudo function calls to perform an enhanced feature on a WINDOWS SIDESHOW device, according to one embodiment of the present invention.
Figure 4B:
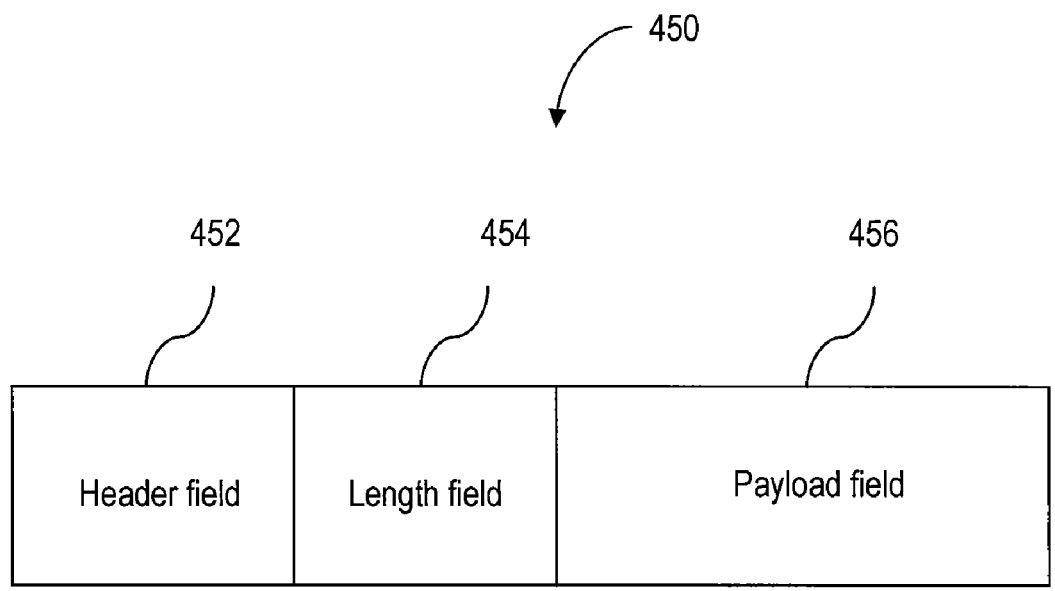
FIG. 4B is a simplified diagram representing a packet destined to be sent to an embedded OS in a WINDOWS SIDESHOW device, according to one embodiment of the present invention.

In one implementation, for the functions supported by the tiny media API 256 and also invoked to carry out the enhanced feature, before any data associated with such functions is delivered through the virtual UART 212, the data first goes through an encapsulation process, which involves packetizing and encoding, and an extraction process, which involves decoding. Again in conjunction with FIGS. 2A and 2B, FIG. 4A is a flow chart illustrating a sequence 400 of pseudo function calls to perform an enhanced feature on the WINDOWS SIDESHOW device 200, according to one embodiment of the present invention. Here, the WINDOWS SIDESHOW device 200 is configured with a new feature of "playing back music" on its own speakers. If the feature is selected to play back a particular song, then a pseudo function call, "Open UART," which is supported by the WINDOWS SIDESHOW API 254, the tiny CLR 258, and the embedded OS 260, is invoked in step 402 during the initialization process of the WINDOWS SIDESHOW device 200. The invocation of this pseudo function call opens all communication ports, both the physical and the virtual ports. After successfully opening the communication ports, the data associated with the selected feature is packetized in step 404 via the invocation of the pseudo function calls of "generate packet" and "encode packet". FIG. 4B is a simplified diagram representing such a packet 450 destined to be sent to the embedded OS 260, according to one embodiment of the present invention. Particularly, the packet 450 includes a header field 452 containing different types of commands (e.g., play, pause, stop, forward, or rewind) to be executed by the embedded OS 260, a length field 454 containing the size of the payload, and a payload field 456 containing the information such as which music file should be accessed (e.g., song 1).

With the data associated with the selected feature of playing back music in a packet, in step 406, the packet is sent to the embedded OS 460 as the pseudo function call "Send UART" is invoked. In one implementation, this "Send UART" function is supported by the WINDOWS SIDESHOW API 254. If this function is invoked with a destination port number that is specifically associated with the virtual UART port 212, then the packet is delivered through the virtual UART port. In step 408, the embedded OS 260 receives the packet by intercepting it from the virtual UART port 212 and decodes the packet by invoking the "decode packet" pseudo function to extract the information residing in the packet. The embedded OS 260 executes the command extracted from the header field 452 of FIG. 4B to operate on the file based on the information extracted from the payload field 456 in step 410. It should be noted the embedded OS 260 provides a layer of abstraction to the built-in gadget 250, WINDOWS SIDESHOW API 254, and tiny CLR 258, so that they are unaware of the existence of the virtual UART port 212 and the processes of encapsulation and extraction.

It is worth noting that for the functions provided by the tiny media API 256, which are mainly used to implement one or more enhanced features for the WINDOWS SIDESHOW device 200, the data associated with these newly-supported functions are sent to the embedded OS 260 through a virtual communication port. In addition, the embedded OS 260 enables the WINDOWS SIDESHOW device 200 greater flexibilities to access and manage the hardware resources 262. As also mentioned above, by assigning port numbers that differ from the physical communication ports supported by the hardware 262 to correspond to the virtual communication ports, the embedded OS 260 can use the port numbers to determine where to direct the received packet.

Figure 5A:
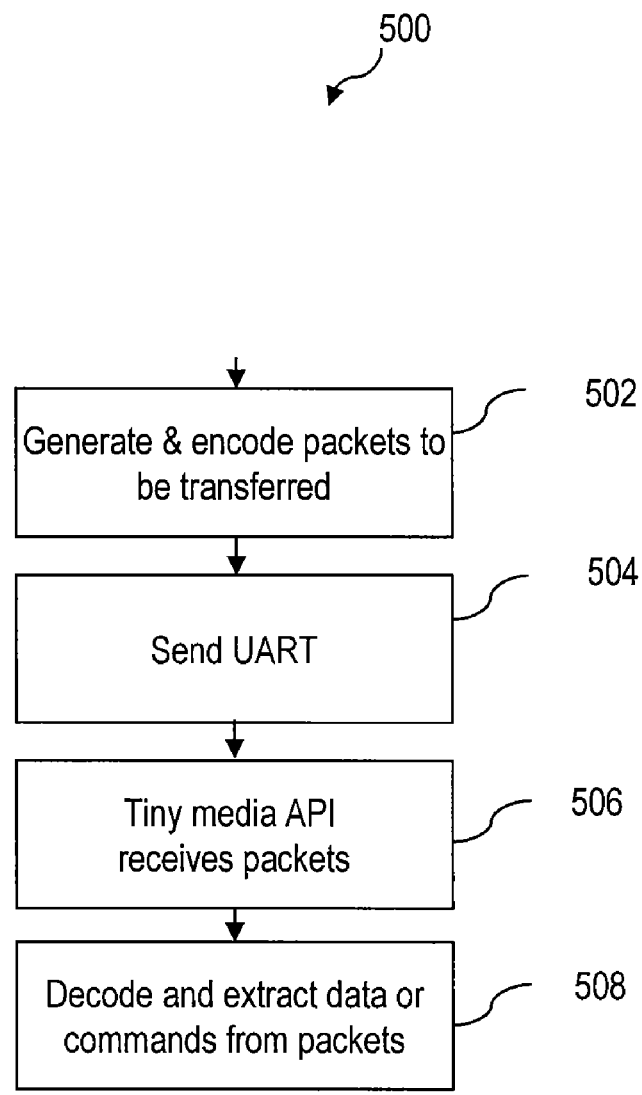
FIG. 5A is a flow chart illustrating a sequence of invoking pseudo function calls to respond to requests from a built-in gadget in a WINDOWS SIDESHOW device, according to one embodiment of the present invention.

Instead of sending data or command from the built-in gadget 252 of FIG. 2B to the embedded OS 260, the embedded OS 260 may need to respond to requests from the built-in gadget 252 for certain status information. FIG. 5A is a flow chart illustrating a sequence 500 of invoking pseudo function calls to respond to requests from the built-in gadget 252, according to one embodiment of the present invention. Suppose the embedded OS 260 successfully accesses the speakers and causes the selected song to be played back on the speakers. In order for the WINDOWS SIDESHOW device 200 of FIG. 2A to display certain status information, such as how much time of the selected song has elapsed, the status information needs to be sent back to the built-in gadget 252. Similar to the sequence 400 shown in FIG. 4A and discussed above, in step 502, the embedded OS generates and encodes a packet containing the requested status information and invokes the "Send UART" function with a port number associated with the virtual UART port in step 504. As a result, the packet is sent through the virtual UART port 212, and is received by the tiny media API 256 in step 506. Then the packet is decoded, and the status information from the decoded packet is extracted by the built-in gadget 252 in step 508.

Figure 5B:
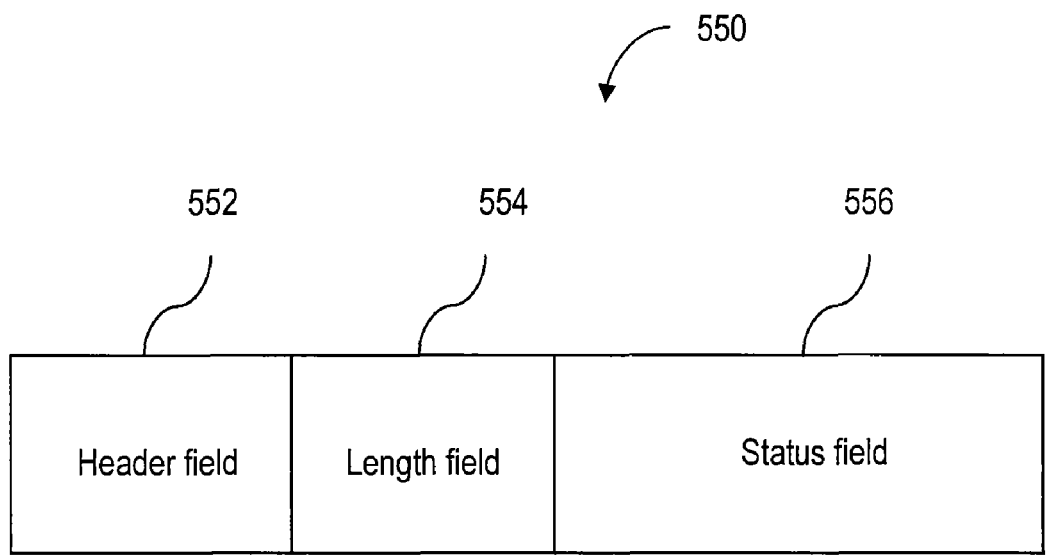
FIG. 5B is a simplified diagram representing a response packet destined for a built-in gadget in a WINDOWS SIDESHOW device, according to one embodiment of the present invention.

FIG. 5B is a simplified diagram representing a response packet 550 destined for the built-in gadget 252, according to one embodiment of the present invention. The response packet 550 includes a header field 552, a length field 554, and a status field 556. In one implementation, the header field 552 stores different commands (e.g., display), and the status field 556 indicates the status of accessing the selected music file (e.g., how much time is left to the end of the selected music file or how much of time has elapsed). One implementation of the built-in gadget 252 causes the status information to be displayed on the WINDOWS SIDESHOW device 200 after it extracts such status information from the received packet.

As has been demonstrated, the WINDOWS SIDESHOW device according to one embodiment of the present invention is capable of supporting enhanced features. Such a WINDOWS SIDESHOW device is configured with an enhanced API, an embedded OS, and virtual communication channels. By transferring data or commands via the virtual communication channels, the WINDOWS SIDESHOW device not only maintains its compatibility with the existing WINDOWS SIDESHOW technology, but it also is able to support enhanced features and additional hardware resources.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

We claim:

1. A method for enabling an auxiliary system that drives an auxiliary display to support enhanced features, the method comprising:
   providing a first application programming interface (API) that is unable to access a hardware resource of the auxiliary system;
   providing a second API that supplements the first API and is able to access the hardware resource of the auxiliary system;
   emulating a physical communication channel to establish a virtual communication channel between software components that operate on the auxiliary system;
   encapsulating data associated with a first function defined by the second API and utilized to implement an enhanced feature associated with the hardware resource of the auxiliary system; and
   sending the encapsulated data through the virtual communication channel for an embedded operation system (OS) to manage the hardware resource of the auxiliary system to perform the enhanced feature.

2. The method of claim 1, further comprising opening the virtual communication channel before sending the encapsulated data.

3. The method of claim 1, further comprising assigning a port number to the virtual communication channel that differs from physical communication ports supported by hardware resources of the auxiliary system that the first API can access.

4. The method of claim 1, wherein the encapsulating step further comprising placing the data in a packet and encoding the packet.

5. The method of claim 4, further comprising decoding the packet and extracting the data from the packet after the embedded OS receives the packet.

6. The method of claim 1, wherein the embedded OS abstracts the hardware resources of the auxiliary system from another software component configured to operate in the auxiliary system.

7. The method of claim 1, further comprising opening the emulated physical communication channel and the virtual communication channel as the auxiliary system completes an initiation process.

8. An auxiliary system configured to drive an auxiliary display and support enhanced features, the auxiliary system comprising:
- a processing unit;
- a hardware resource of the auxiliary system;
- a first application programming interface (API) that is unable to access the hardware resource of the auxiliary system;
- a second API that supplements the first API and is able to access the hardware resource of the auxiliary system; and
- a memory unit, wherein the memory unit contains a sequence of instructions, which when executed by the processing unit, causes the processing unit to:
  - establish a virtual communication channel that emulates a physical communication channel between software components that operate on the auxiliary system;
  - encapsulate data associated with a first function defined by the second API and utilized to implement an enhanced feature associated with the hardware resource of the auxiliary system; and
  - send the encapsulated data through the virtual communication channel to an embedded operating system (OS) so that the hardware resource of the auxiliary system is managed to perform the enhanced feature.

9. The auxiliary system of claim 8, wherein the processing unit is further configured to open the virtual communication channel before sending the encapsulated data.

10. The auxiliary system of claim 8, wherein the processing unit is further configured to assign a port number to the virtual communication channel that differs from physical communication ports supported by hardware resources of the auxiliary system that the first API can access.

11. The auxiliary system of claim 8, wherein the processing unit is further configured to place the data in a packet and encode the packet before sending the packet through the virtual communication channel.

12. The auxiliary system of claim 11, wherein the processing unit is further configured to decode the packet and extract the data from the packet after the embedded OS receives the packet.

13. The auxiliary system of claim 8, wherein the embedded OS abstracts the hardware resources from another software component configured to operate in the auxiliary system.

14. The auxiliary system of claim 8, wherein the processing unit is further configured to open the emulated physical communication channel and the virtual communication channel as the auxiliary system completes an initiation process.

15. A computer-readable medium containing a sequence of instructions for a software stack that, when executed by a processing unit in an auxiliary system configured to drive an auxiliary display and support enhanced features, causes the processing unit to:
- establish a virtual communication channel that emulates a physical communication channel supported by a hardware resource of the auxiliary system, wherein a first application programming interface (API) is unable to access the hardware resource of the auxiliary system;
- encapsulate data associated with a first function defined by a second API in the software stack and utilized to implement an enhanced feature associated with the hardware resource of the auxiliary system, wherein the second API supplements the first API and is able to access the hardware resource of the auxiliary system; and
- send the encapsulated data through the virtual communication channel to an embedded operating system (OS) in the software stack so that the hardware resource is managed to perform the enhanced feature.

16. The computer-readable medium of claim 15, further containing a sequence of instructions for the software stack, which when executed by the processing unit, causes the processing unit to open the virtual communication channel before sending the encapsulated data.

17. The computer-readable medium of claim 15, further containing a sequence of instructions for the software stack, which when executed by the processing unit, causes the processing unit to assign a port number to the virtual communication channel that differs from physical communication ports supported by hardware resources of the auxiliary system that the first API can access.

18. The computer-readable medium of claim 15, further containing a sequence of instructions for the software stack, which when executed by the processing unit, causes the processing unit to place the data in a packet and encode the packet before sending the packet through the virtual communication channel.

19. The computer-readable medium of claim 18, further containing a sequence of instructions for the software stack, which when executed by the processing unit, causes the processing unit to decode the packet and extract the data from the packet after the embedded OS receives the packet.

20. The computer-readable medium of claim 15, further containing a sequence of instructions for the software stack, which when executed by the processing unit, causes the processing unit to open the emulated physical communication channel and the virtual communication channel as the auxiliary system completes an initiation process.

* * * * *